US008616156B2

(12) United States Patent
Krouse

(10) Patent No.: US 8,616,156 B2
(45) Date of Patent: Dec. 31, 2013

(54) WATER TREATMENT SYSTEM FOR EGG PROCESSING FACILITY

(76) Inventor: Robert L. Krouse, North Manchester, IN (US)

( * ) Notice: Subject to any disclaimer, the term of this patent is extended or adjusted under 35 U.S.C. 154(b) by 1862 days.

(21) Appl. No.: 11/345,070

(22) Filed: Jan. 31, 2006

(65) Prior Publication Data

US 2007/0175398 A1 Aug. 2, 2007

(51) Int. Cl.
*A01K 31/18* (2006.01)
*A01K 45/00* (2006.01)

(52) U.S. Cl.
USPC ............................................ 119/437; 119/6.8

(58) Field of Classification Search
USPC .................. 119/6.8, 437, 436, 449, 440, 487; 210/195.1, 257, 259, 266
See application file for complete search history.

(56) References Cited

U.S. PATENT DOCUMENTS

| | | | |
|---|---|---|---|
| 4,230,071 A * | 10/1980 | Phillips | 119/440 |
| 4,790,943 A | 12/1988 | Dunn et al. | |
| 5,009,791 A | 4/1991 | Lin et al. | |
| 5,173,190 A * | 12/1992 | Picek | 210/651 |
| 5,262,047 A | 11/1993 | Benskin et al. | |
| 5,318,708 A | 6/1994 | Benskin et al. | |
| 5,322,623 A | 6/1994 | Benskin et al. | |
| 5,514,282 A | 5/1996 | Hibbard et al. | |
| 5,783,089 A | 7/1998 | Anderson et al. | |
| 6,203,702 B1 | 3/2001 | Sheaffer | |
| 6,379,549 B1 | 4/2002 | LePoder et al. | |
| 6,692,642 B2 | 2/2004 | Josse et al. | |
| 6,802,984 B1 | 10/2004 | Perkins et al. | |
| 2002/0014460 A1 | 2/2002 | McKay | |
| 2003/0094422 A1 | 5/2003 | Perkins et al. | |
| 2005/0016934 A1 | 1/2005 | Perkins et al. | |
| 2005/0126996 A1 | 6/2005 | Herring, Sr. | |

FOREIGN PATENT DOCUMENTS

| | | | | |
|---|---|---|---|---|
| EP | 388071 A1 * | 9/1990 | ............ | A01K 43/00 |
| JP | 04335843 A * | 11/1992 | ............ | A01K 31/00 |
| JP | 10056909 A * | 3/1998 | ............ | A01K 43/00 |

OTHER PUBLICATIONS

U.S. Environmental Protection Agency, "Wastewater Technology Fact Sheet, Sequencing Batch Reactors," EPA832-F-99-073, 9 pgs., Sep. 1999.
"MemJet® Immersed Membrane Bioreactor Systems" Data Sheet, U.S. Filter Corporation, 2 pgs., 2005.
"Protocol for Solicitation of Quotations from Qualified Vendors for the Furnishing and/or/Installation of Water and/or Wastewater Treatment Equipment and/or Services to Serve the Proposed Egg Operation for Midwest Poultry's Millennium Facility in Ionia County, Michigan," Jul. 2002, 9 pgs.
"Addendum No. 1 to the RFP for Water and Wastewater Facilities to Serve the Proposed Egg Laying Operations at the Millenium Facility in Ionia County, Michigan," undated, 3 pgs.

* cited by examiner

*Primary Examiner* — Son T Nguyen
(74) *Attorney, Agent, or Firm* — Faegre Baker Daniels LLP

(57) ABSTRACT

A system for treating water for subsequent consumption by animals. Illustratively, the system includes a wastewater treatment facility configured to treat wastewater effluent from an egg washer for subsequent consumption by egg producing birds. Further illustratively, stormwater run off collected from the facility is treated for subsequent consumption by the birds.

19 Claims, 2 Drawing Sheets

WATER TREATMENT SYSTEM FOR EGG PROCESSING FACILITY

BACKGROUND AND SUMMARY OF THE INVENTION

The present invention relates generally to the treatment of water within an egg processing facility and, more particularly, to the recycling and treatment of water for consumption by egg producing birds.

Egg production and processing facilities typically include a number of egg producing birds which supply eggs for subsequent washing, grading, packing, and shipment. More particularly, the egg processing facility is configured to wash the eggs with treated water prior to further processing. The disposal of the wastewater effluent from the egg washer has traditionally involved the construction of ponds or lagoons, the land application of the wastewater effluent, and/or the direct discharge of the wastewater effluent. Further, such egg processing facilities may consume a large amount of water which is traditionally supplied by raw water sources, such as water wells or municipal water systems.

As such, there is a need for an egg processing facility which reduces the amount of raw water utilized, reduces or eliminates the need to construct wastewater ponds or lagoons, and reduces or eliminates the need to land apply or direct discharge the wastewater effluent.

According to an illustrative embodiment of the present disclosure, an egg production and processing facility includes at least one house for housing a plurality of egg producing birds, and an egg washer configured to wash eggs produced by the plurality of birds and thereby producing a wastewater effluent. A wastewater treatment facility is in fluid communication with the egg washer and is configured to receive the wastewater effluent from the egg washer. The wastewater treatment facility is configured to treat the wastewater effluent by removing contaminants. A bird water device is in fluid communication with the wastewater treatment facility and is configured to supply the treated effluent from the wastewater treatment facility to the plurality of birds.

According to a further illustrative embodiment of the present disclosure, a water treatment system is provided for use with an egg production facility having a geographical boundary and a plurality of egg producing birds. The system includes a stormwater collector configured to collect stormwater runoff from within the geographical boundary of the egg configured to collect stormwater runoff from within the geographical boundary of the egg production facility. A water treatment facility is located within the geographical boundary of the egg production facility, is in fluid communication with the stormwater collector, and is configured to treat the stormwater runoff. A bird water device is located within the geographical boundary of the egg production facility, is in fluid communication with the water treatment facility, and is configured to supply the treated effluent from the water treatment facility to the plurality of birds.

According to another illustrative embodiment of the present disclosure, a method of recycling egg wash water is provided. The method includes the steps of providing a plurality of birds at a facility configured to produce eggs, and washing the eggs at the facility with water and a cleaning agent, the egg washing step producing an effluent. The method further comprises the steps of treating the effluent to remove contaminants, and supplying the treated effluent to birds for consumption.

According to yet another illustrative embodiment of the present disclosure, a method of supplying consumption water for livestock in a facility is provided. The method includes the steps of collecting stormwater runoff from the facility, and treating the stormwater at the facility to remove contaminants. The method further includes the step of supplying the treated stormwater to the livestock for consumption.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DESCRIPTION OF THE DRAWINGS

Figure 1:
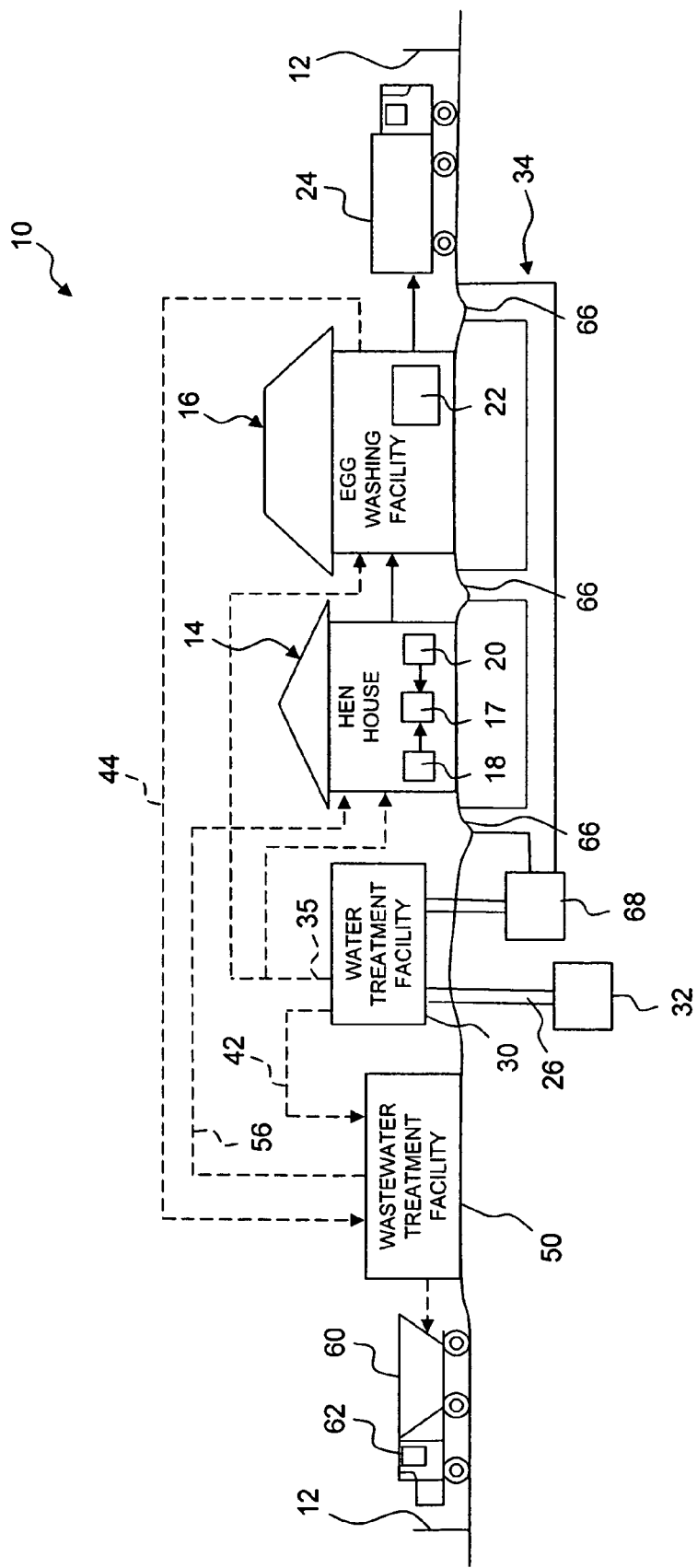
FIG. 1 is a schematic diagram illustrating an egg production and processing facility incorporating an illustrative embodiment water treatment system.

Referring initially to FIG. 1, a schematic diagram of an egg production and processing facility or plant 10 is provided. The egg production and processing plant 10 includes a land area or geographical boundary 12 within which is supported at least one hen house 14 and an egg washing facility 16. The hen house 14 may be of conventional design and is configured to house a plurality of egg producing birds or hens 17. It should be appreciated that while the present invention is described in connection with chickens, aspects of the invention may find applicability with other forms of livestock including, but not limited to turkeys, cattle and hogs.

A feed storage bin 18 is illustratively positioned within the hen house 14 and is configured to supply feed to the birds 17. Similarly, a bird water device 20 is positioned within the hen house 14 and is configured to provide water for consumption by the birds 17.

Figure 2:
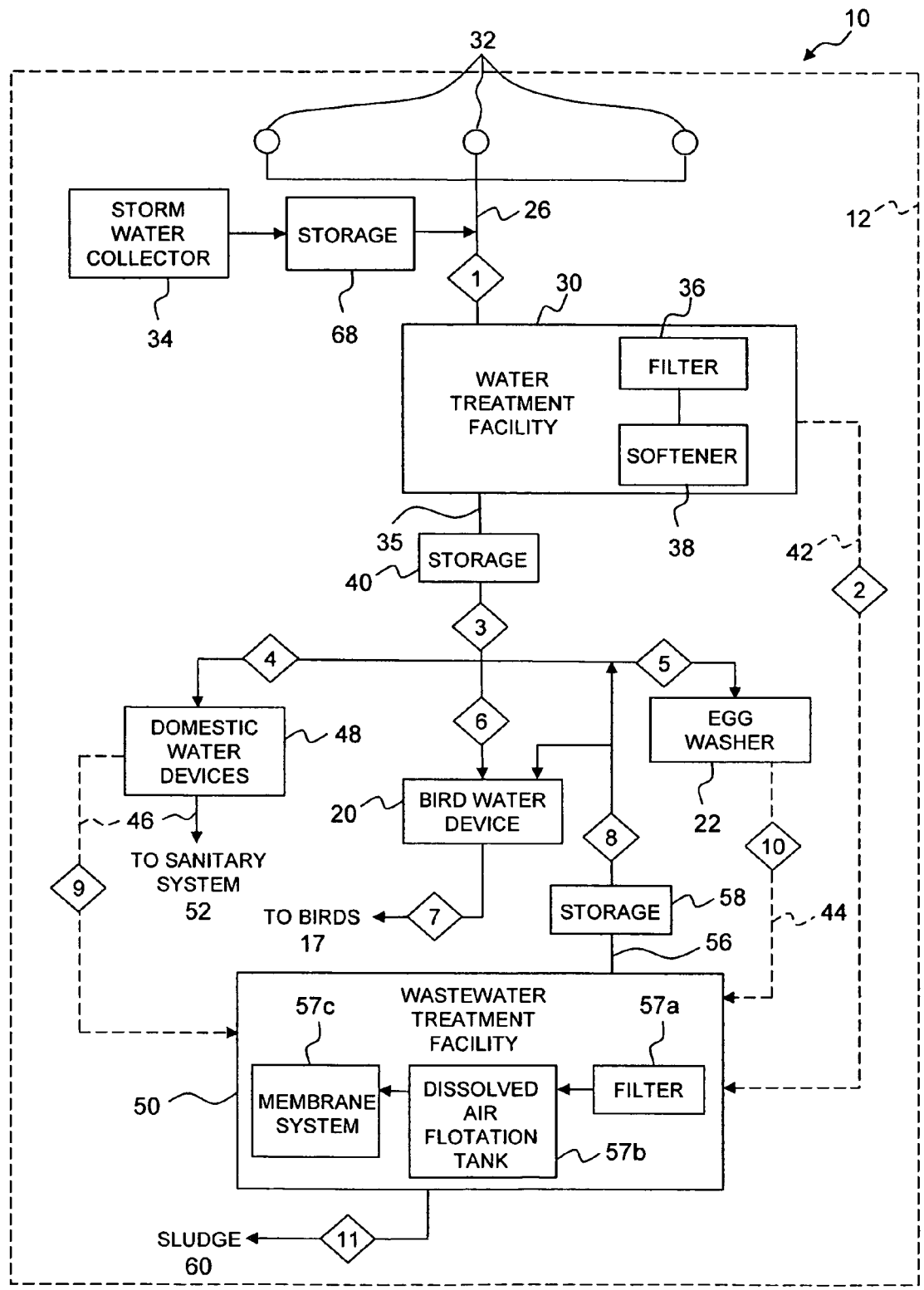
FIG. 2 is schematic diagram of the water treatment system of FIG. 1.

With reference to FIGS. 1 and 2, the egg washing facility 16 includes an egg washer 22 configured to receive eggs produced by the birds 17 in the hen house 14. Illustratively, the egg washer 22 uses a potassium based cleaning agent suspended within water to wash the eggs in a conventional manner. Once the eggs are cleaned, they are further processed for shipment as shell eggs or egg products. The processed eggs are then provided to conventional transport devices, such as trucks 24.

In an illustrative embodiment of the present disclosure, raw water 26 is supplied to a water treatment facility 30. The raw water 26 may be supplied from a conventional water source, such as water wells 32. Alternatively, the raw water 26 may be provided from other sources, such as a municipal water system. In a further illustrative embodiment, the raw water 26 is supplied from a stormwater collector 34, as further detailed herein.

Table I below provides illustrative characteristics of representative raw water 26 supplied from a well 32.

TABLE I

| PARAMETER | VALUE |
| --- | --- |
| Total alkalinity, mg/L | 320 |
| Total hardness, mg/L as CaCO3 | 290 |
| Total dissolved solids (TDS), mg/L | 260 |
| pH, s.u. | 7.4 |

TABLE I-continued

| PARAMETER | VALUE |
| --- | --- |
| Conductivity, umhos/cm | 540 |
| Calcium, mg/L | 75 |
| Magnesium, mg/L | 30 |
| Sodium, mg/L | 6 |
| Iron, mg/L | 2 |
| Manganese, mg/L | 0.08 |

The water treatment facility 30 may be of conventional design and is configured to remove contaminants and produce a treated raw water 35. The water treatment facility 30 illustratively includes a filter 36 configured to remove contaminants from the raw water 26, including manganese and iron. The water treatment facility 30 may also include devices to reduce bacteria levels to acceptable standards, such as a chlorine injector, an ozone generator, or an ultraviolet light. Additionally, the water treatment facility 30 illustratively includes a softener 38 configure to reduce the hardness of the raw water 26. It should be appreciated that the softener 38 is optional and may only be desirable when the raw water 26 has unacceptably high hardness. The treated raw water 35 may be provided to a clear well or storage tank 40 to accommodate variability in demand.

Table II below provides illustrative requirements for the treated raw water 35.

TABLE II

| PARAMETER | VALUE |
| --- | --- |
| Total hardness, mg/L as CaCO3 | 120 |
| Iron, mg/L | 0.05 |
| Manganese, mg/L | 0.01 |
| pH, s.u. | 7 to 8, substantially stable to avoid scaling downstream |
| Chlorine residual, mg/L | 1 |

Wastewater effluent 42 from the water treatment facility 30 results from filter backwash and softener regeneration. The wastewater 42 typically includes oxidized iron and manganese. Further, the wastewater 42 may include concentrations of calcium, magnesium, and/or potassium chloride.

The egg washer 22 receives treated raw water 35 supplied by the water treatment facility 30. The egg washer 22 mixes the treated raw water 35 with conventional egg cleaning agents, which are typically potassium based. The resulting mixture is used to clean the eggs in a known manner. This cleaning process results in an egg wash wastewater effluent 44.

Characteristics of an illustrative egg wash wastewater effluent 44 are provided in Table III below.

TABLE III

| PARAMETER | VALUE |
| --- | --- |
| Total alkalinity, mg/L as CaCO3 | 390 |
| BOD5, mg/L | 6,500 |
| CBOD, mg/L | 6,200 |
| COD, mg/L | 8,600 |
| TDS, mg/L | 3,900 |
| TSS, mg/L | 900 |
| pH, s.u. | 8.5 to 9.0 |
| Conductivity, umhos/cm | 1,670 |
| TKN, mg/L | 470 |
| NH3-N, mg/L | 47 |
| Total phosphorus, mg/L | 61 |

TABLE III-continued

| PARAMETER | VALUE |
| --- | --- |
| Sulfate, mg/L | 150 |
| Chloride, mg/L | 190 |
| Calcium, mg/L | 110 |
| Magnesium, mg/L | 30 |
| Sodium, mg/L | 350 |
| Potassium, mg/L | 75 |
| Iron, mg/L | 1.5 |
| Manganese, mg/L | 0.9 |
| TVS, % of Total Solids | 80 |

It should be noted that additional wastewater effluents 46 may be created from additional sources, for example from domestic water devices 48, such as cleaning drains used in connection with equipment and facility area cleaning. Such domestic water devices 48 may also include hand sinks and toilets. In such instances, soap and other additional cleaning agents will likely be used. Illustratively, the wastewater effluents 42, 44, and 46 from the water treatment facility 30, the egg washer 22, and the domestic water devices 48, respectively, are provided to a wastewater treatment facility 50.

In alternative embodiments, domestic water devices 48 may be coupled to a conventional sanitary system 52. More particularly, the wastewater effluent 46 generated from the domestic water devices 48 may be supplied to a septic tank, drainage field system, or municipal sewer system.

The wastewater treatment facility 50 is configured to treat the incoming wastewater effluents 42, 44, 46 such that the resulting treated water 56 has quality standards sufficient for human consumption. The wastewater treatment facility 50 may be of conventional design. For example, the wastewater treatment facility 50 may utilize known sequencing batch reactor (SBR) technology or membrane treatment technology. SBR is a fill-and-draw activated sludge system for wastewater treatment. In this system, wastewater is added to a single "batch" reactor, treated to remove undesirable components, and then discharged.

Membrane treatment technology often uses a membrane bioreactor (MBR) which combines a biological treatment process with a membrane system to provide organic and suspended solid removal. Flow passes through the membranes, while solids remain in the biological treatment system. As shown in the illustrative embodiment wastewater treatment facility 50 of FIG. 2, wastewater effluents 42, 44, 46 are screened by a filter 57a before entering a dissolved air flotation tank 57b, where aeration provides oxygen for biological respiration and maintains solids in suspension. Submerged membranes within a membrane system 57c permits the passage therethrough of oxidized and nitrified water. MBR systems are available from a variety of sources, including US Filter of Sturbridge, Mass., and ZENON Environmental Inc. of Oakville, Canada.

Illustratively, the treated wastewater 56 may be supplied to a storage tank 58 to account for variability in demands. The treated water 56 may be combined with treated raw water 35 from the water treatment facility 30, and supplied to the bird water device 20 for consumption by the birds 17. The treated water 56 may also be supplied to the egg washer 22 and/or the domestic water devices 48. More particularly, the treated water 56 may be supplied to the egg washer 22 for subsequent egg cleaning. Domestic water devices 48, such as drinking water, water for bathrooms, etc., may also be supplied from the water treatment facility 50.

According to an illustrative embodiment, the treated water 56 from the wastewater treatment facility 50 meets or exceeds the characteristics detailed in Table IV below.

TABLE IV

| PARAMETER | VALUE |
| --- | --- |
| BOD5, mg/L | 30 |
| CBOD5, mg/L | 25 |
| COD, mg/L | 300 |
| TSS, mg/L | 30 |
| NH3-N, mg/L | 7 |
| Surfactants, mg/L | 2 |
| pH, s.u. | 7 to 8 |
| Chlorine residual, mg/L | 1 |

In the tables provided herein, the terms used to identify water characteristics are known in the art. For example, BOD5 is commonly defined as biological oxygen demand, and is the amount of dissolved oxygen consumed in five days by biological processes breaking down organic matter. CBOD is commonly defined as carbonaceous biological oxygen demand, which represents the BOD from organic compounds and oxidation of inorganic compounds such as ferrous iron and sulfide. COD is commonly defined as chemical oxygen demand, which is used as a measure of the oxygen equivalent of the organic matter content of a water sample. TDS is commonly known as total dissolved solids, and is a water quality parameter defining the concentration of dissolved organic and inorganic chemicals in water. TSS is commonly known as total suspended solids in the amount of filterable solids in a water sample. TKN is commonly defined as total Kjeldahl nitrogen, which is the measure of total organic nitrogen. TVS is commonly known as total volatile solids, which are those solids lost on ignition (heating to 550° C.). Total solids is commonly defined as the total of all solids in a water sample and includes total suspended solids, total dissolved solids, and total volatile solids.

A sludge 60 is a by-product from the wastewater treatment facility 50 and is configured to be transported offsite by conventional transport devices, such as trucks 62. To reduce the amount of treatment sludge 60 for disposal, the sludge volumes produced by the wastewater treatment facility 50 may be reduced by thickening and drying.

As described herein, the treated water 56 from the wastewater treatment facility 50 may be provided to a storage tank 58 for subsequent use in the bird water device 20, the egg washer 22, and/or the domestic water devices 48. More particularly, the treated water 56 is illustratively provided directly to the birds 17 for consumption, to the egg washer 22 for egg cleaning, and/or to the domestic water devices 48 for use in sinks, etc.

With further reference to FIG. 1, the egg production and processing facility 10 includes a stormwater collector 34. Illustratively, the stormwater collector 34 comprises a plurality of collection points or stormwater drains 66 in fluid communication with a storage pond or tank 68. The storage tank 68 is in fluid communication with the water treatment facility 30. The stormwater collector 34 collects stormwater run off from the hen house 14, the egg washing facility 16, and the land adjacent thereto, then filters and purifies the stormwater to acceptable standards for consumption by the birds 17. More particularly, the water treatment facility 30 treats the water in the manner detailed above and the treated water 35 is then supplied to a storage tank 40 as needed. It should be appreciated that the stormwater could be alternatively supplied to the wastewater treatment facility 50 for treatment. The treated stormwater is then available for washing eggs at the egg washer 22, for consumption by the birds 17 at the bird water device 20, and for use by the domestic water devices 48. As may be appreciated, the use of stormwater reduces or eliminates subsequent disposal of the stormwater run off, thereby reducing or avoiding problems associated with extended storage of the stormwater and subsequent land application or direct discharge to a sewer system.

The system of the present invention may be configured for use with egg production and processing facilities 10 of varying scopes and sizes. For illustrative purposes, approximately 130,000 gallons per day of water would be consumed by 2.5 million birds 17, in this case chickens. Washing of the eggs produced by the chickens 17 would consume about 25,000 gallons of water per day. Illustratively, the wastewater treatment facility 50 would process approximately 30,000 gallons of water per day, which would satisfy around 23% of the water needed by the chickens 17.

Additional estimated daily quantities of water are provided in Table V below, wherein the meter locations are identified by numbers within diamonds in FIG. 2.

TABLE V

| Meter Location | Estimated Daily Quantities |
| --- | --- |
| 1 | 135,000 |
| 2 | 5,000 |
| 3 | 130,000 |
| 4 | 5,000 |
| 5 | 25,000 |
| 6 | 100,000 |
| 7 | 130,000 |
| 8 | 30,000 |
| 9 | 5,000 |
| 10 | 25,000 |
| 11 | 5,000 |

Illustratively, the water treatment facility 30 and the wastewater treatment facility 50 are located within boundary 12 of the egg processing facility. Moreover, the hen house 14, including the bird water device 20, the egg washing facility 16, including the egg washer 22, the water treatment facility 30, and the wastewater treatment facility 50 all form part of the egg production and processing facility 10. As such, the water treatment facility 30 and the wastewater treatment facility 50 define "clean-in-place" or "CIP" systems.

Although the invention has been described in detail with reference to certain preferred embodiments, variations and modifications exist within the spirit and scope of the invention as described defined in the following claims.

The invention claimed is:

1. An egg production and processing facility comprising:
    at lease one house for housing a plurality of egg producing birds;
    an egg washer configured to wash eggs produced by the plurality of birds and thereby producing a wastewater effluent;
    a wastewater treatment facility in fluid communication with the egg washer and configured to receive the wastewater effluent form the egg washer;
    the wastewater treatment facility configured to treat the wastewater effluent by removing contaminants;
    a bird water device in fluid communication with the wastewater treatment facility and configured to supply the treated effluent from the wastewater treatment facility to the plurality of birds;
    a raw water source; and
    a water treatment facility in fluid communication with the raw water source and the egg washer, wherein the water treatment facility is configured to treat the raw water and provide treated water to the egg washer.

2. The facility of claim 1, wherein the water treatment facility is configured to provide treated water to the bird water device.

3. The facility of claim 1, wherein a byproduct effluent from the water treatment facility is supplied to the wastewater treatment facility.

4. The facility of claim 1, wherein the water treatment facility includes a filter configured to reduce manganese and iron in the raw water.

5. The facility of claim 1, wherein the wastewater treatment facility includes a membrane reactor.

6. The facility of claim 1, further comprising:
at least one stormwater drain; and
a stormwater collector in fluid communication with the water treatment facility and configured to collect stormwater runoff from the at least one stormwater drain and supply the runoff to the water treatment facility.

7. The facility of claim 6, further comprising water storage fluidly coupled intermediate the stormwater collector and the water treatment facility.

8. The facility of claim 1, wherein the egg washer is configured to receive the treated effluent from the wastewater treatment facility.

9. The facility of claim 1, wherein the raw water source comprises a water well.

10. The facility of claim 1, further comprising domestic water devices in fluid communication with the water treatment facility and the wastewater treatment facility.

11. The facility of claim 1, further comprising water storage fluidly coupled intermediate the waste water treatment facility and the bird water device.

12. An egg production and processing facility comprising:
a raw water source;
at least one house for housing a plurality of egg producing birds;
an egg washer configured to wash eggs produced by the plurality of birds and thereby producing a wastewater effluent;
a water treatment facility fluidly coupled intermediate the raw water source and the egg washer, the water treatment facility being configured to treat the raw water and provide treated water to the egg washer;
a wastewater treatment facility in fluid communication with the egg washer and configured to receive the wastewater effluent from the egg washer, the wastewater treatment facility being configured to treat the wastewater effluent by removing contaminants; and
a bird water device in fluid communication with the wastewater treatment facility and configured to supply the treated effluent from the wastewater treatment facility to the plurality of birds.

13. The facility of claim 12, wherein the water treatment facility is configured to provide treated water to the bird water device.

14. The facility of claim 12, wherein a byproduct effluent from the water treatment facility is supplied to the wastewater treatment facility.

15. The facility of claim 12, wherein the water treatment facility includes a filter configured to reduce manganese and iron in the raw water.

16. The facility of claim 12, further comprising:
at least one stormwater drain; and
a stormwater collector in fluid communication with the water treatment facility and configured to collect stormwater runoff from the at least one stormwater drain and supply the runoff to the water treatment facility.

17. The facility of claim 12, wherein the egg washer is configured to receive the treated effluent from the wastewater treatment facility.

18. The facility of claim 12, wherein the raw water source comprises a water well.

19. The facility of claim 12, further comprising domestic water devices in fluid communication with the water treatment facility and the wastewater treatment facility.

* * * * *